United States Patent [19]

Bertrand

[11] 4,262,976

[45] Apr. 21, 1981

[54] BEARING SUPPORT

[76] Inventor: Alcide Bertrand, Silver Creek Road, Salmon Arm, Canada

[21] Appl. No.: 88,300

[22] Filed: Oct. 26, 1979

[30] Foreign Application Priority Data

Jul. 31, 1979 [CA] Canada .................................. 332933

[51] Int. Cl.³ ............................................. F16C 32/06
[52] U.S. Cl. ............................................ 308/9; 415/7
[58] Field of Search ..................... 308/9, DIG. 1, 122, 308/170, DIG. 4; 415/7

[56] References Cited

U.S. PATENT DOCUMENTS

| | | | |
|---|---|---|---|
| 39,562 | 8/1863 | Francis | 308/9 |
| 408,295 | 8/1889 | De Ferranti | 324/92 |
| 831,794 | 9/1906 | Löhle | 308/9 |
| 3,637,196 | 1/1972 | Kaelin | 415/7 |
| 3,721,290 | 3/1973 | Butler | 165/85 |
| 4,089,620 | 5/1978 | Ravitts | 415/7 |

*Primary Examiner*—Lenard A. Footland
*Attorney, Agent, or Firm*—David A. Burge

[57] ABSTRACT

A means for supporting a windmill or similar body consists of a vertically oriented tank placed above or below ground level and filled with a liquid such as water. An air filled cylinder is mounted in the tank, the upper end being adapted to support a windmill. The lower end is pivotally positioned in a mercury sleeve. Further support means includes a circular water-filled channel supporting an annular pontoon or float connected to the cylinder shaft.

3 Claims, 3 Drawing Figures

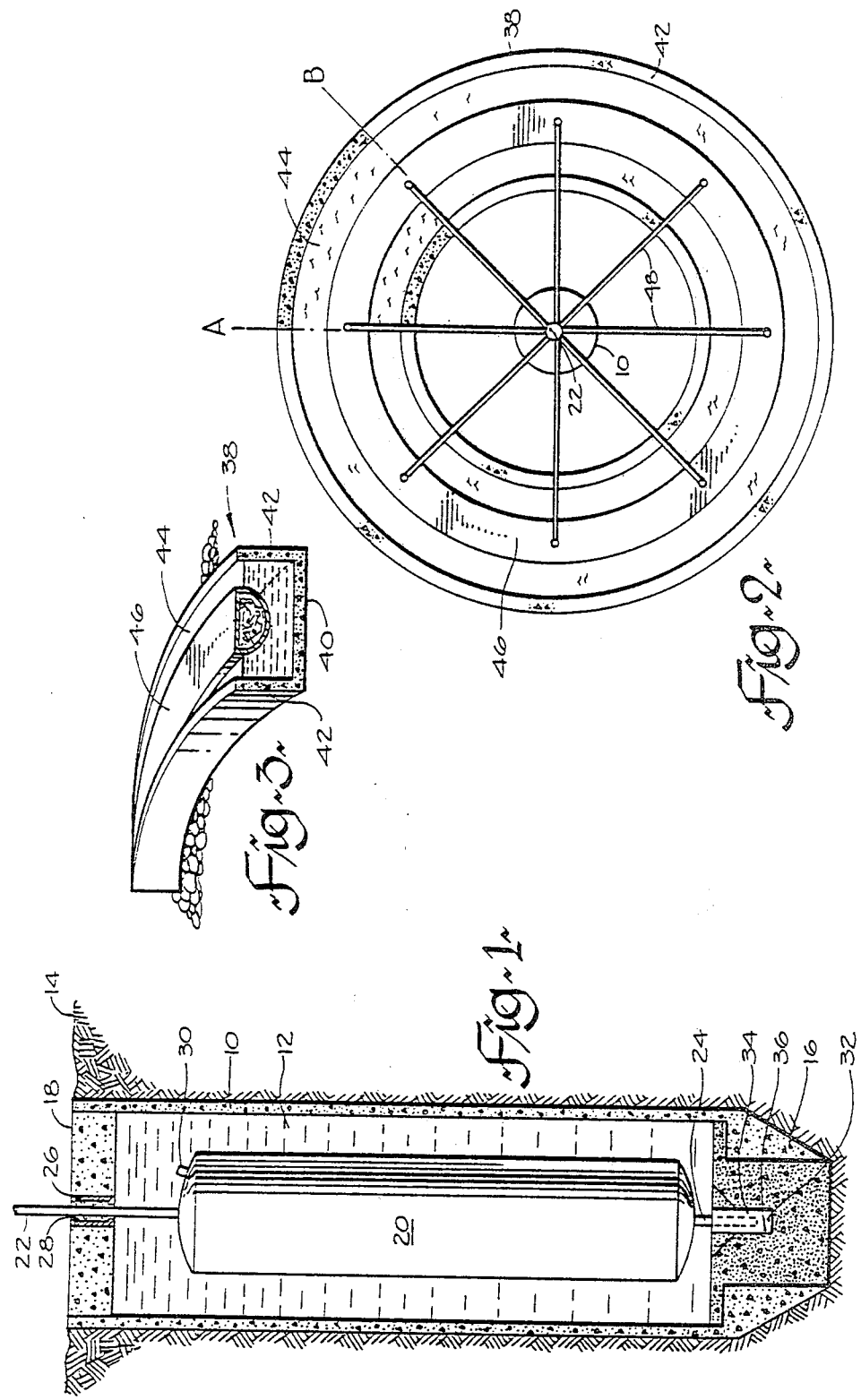

BEARING SUPPORT

This invention relates to support means for large heavy bodies and in particular to liquid footings or bearings for large windmills.

The present concern regarding energy conservation and pollution has fostered a renewed interest in various forms of windmills. One of the problem areas in windmill design, particularly large windmills, is providing proper bearing support for them. In accordance with the present invention, this problem is alleviated by using a form of liquid support, the result being that a minimum amount of effort is required to rotate the windmill shaft with little or no friction being involved.

In accordance with a broad aspect, the invention relates to apparatus for supporting a windmill or the like, and comprising a vertically oriented, liquid filled tank with an air filled cylinder buoyantly supported in the tank, the cylinder having upper and lower axially aligned shafts. The upper shaft is adapted to support the windmill and the lower shaft is pivotally mounted in the lower end of the tank. A horizontal, circular liquid filled channel is positioned outwardly and concentrically relative to the tank and an annular float member is positioned in the channel with means connecting the float member with the upper shaft of the cylinder in the tank.

The invention is illustrated by way of example in the accompanying drawings in which:

FIG. 1 is a cross-sectional view of the vertical tank;

FIG. 2 is a plan view of the concentric channel and float member;

FIG. 3 is a fragmentary sectional view of a portion of the channel of FIG. 2.

Referring to FIG. 1, the means for supporting a large rotatable body such as a windmill generator, propeller and associated mechanism consists of an elongated, vertically oriented tank 10 filled with a suitable liquid such as water 12. The tank 10 could be mounted above ground with suitable support although preferably the tank is mounted below grade 14 as illustrated in FIG. 1, the tank being formed of any suitable material such as concrete and having a base portion 16 and top closure 18.

Positioned within the tank is an elongated cylinder 20 having axially aligned upper and lower shafts 22 and 24 respectively.

The upper shaft 22 would be utilized to support the windmill generator with the windmill propeller or other form of wind responsive rotating means being attached to the upper end of the shaft as well. As seen in the top end of FIG. 1, shaft 22 is positioned in the top closure 18 by means of a sleeve 26 and packing 28. Cylinder 20 is provided with an air valve 30 so that a suitable amount of buoyancy can be applied to the tank in its liquid surroundings.

The lower shaft 24 is mounted in the base 16 of the tank 10 and while in some cases a simple packing sleeve would suffice to support the weight of the windmill and tank 20, for heavier applications the lower shaft 24 would be supported by a bearing 32 comprising a high carbon steel tapered sleeve 34 adapted to enclose a mercury bath 36 to act as a seal and lubricant as well as to inhibit wear of the steel shaft and sleeve.

Referring to FIG. 2, further support means are illustrated to provide additional stability and floatation support to large windmill bodies. A liquid filled channel 38 formed of a horizontally arranged base 40 and adjoining sidewalls 42 is concentrically arranged relative to the tank 10 and is filled with a suitable floatation liquid 44 such as water. An annular float member 46 is positioned in the channel and bracing members 48 of suitable design interconnect the float member 46 with the upper shaft 22 from the tank 10. This arrangement increases the floatation support and stability of the weight carried by the upper shaft 22 particularly in areas of high winds.

In summary, the tank 10 and buoyantly supported air cylinder 20 provides a viable alternative to expensive mechanical bearings and high labour costs attached to their installation.

While the present description has been directed to a windmill support, it will be appreciated that the invention broadly is effective as a bearing means for other large bodies such as flywheels and the like.

Therefore, while the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitation, and there is no intention in the use of such terms and expressions to exclude any equivalents of the features shown and described or portions thereof, but it is recognized that various modifications are possible within the scope of the invention claimed.

I claim:

1. Apparatus for supporting a windmill or the like comprising a vertically oriented, liquid filled tank, an air filled cylinder buoyantly supported in said tank and having upper and lower axially aligned shafts, the upper shaft being adapted to support a windmill and the lower shaft being pivotally mounted in the lower end of said tank, and a horizontal, circular, liquid filled channel positioned concentrically relative to said tank, an annular float member positioned in said channel, and means connecting the float member with the upper shaft of the cylinder in said tank.

2. Apparatus according to claim 1 wherein the claim is mounted below ground level.

3. Apparatus according to claim 1 including a mercury bearing mounted in the lower end of the tank and supporting the lower shaft of the cylinder.

* * * * *